(12) United States Patent
Fuchs et al.

(10) Patent No.: US 12,145,325 B2
(45) Date of Patent: Nov. 19, 2024

(54) VIBRATION WELDING DEVICE AND VIBRATION WELDING METHOD

(71) Applicant: BRANSON Ultraschall Niederlassung der Emerson Technologies Gmbh & Co. OHG, Dietzenbach (DE)

(72) Inventors: Silvio Fuchs, Hasselroth-Neuenhasslau (DE); Bruno Collatz, Dietzenbach (DE); L'udovit Šipoš, Nové Mesto nad Váhom (SK)

(73) Assignee: Branson Ultraschall Niederlassung der Emerson Technologies Gmbh & Co. OHG, Dietzenbach (DE)

( * ) Notice: Subject to any disclaimer, the term of this patent is extended or adjusted under 35 U.S.C. 154(b) by 66 days.

(21) Appl. No.: 17/879,040

(22) Filed: Aug. 2, 2022

(65) Prior Publication Data
US 2023/0081335 A1    Mar. 16, 2023

(30) Foreign Application Priority Data
Sep. 10, 2021 (EP) .................................. 21195906

(51) Int. Cl.
*B29C 65/06* (2006.01)
*B29C 65/00* (2006.01)

(52) U.S. Cl.
CPC ...... *B29C 66/8322* (2013.01); *B29C 65/0618* (2013.01)

(58) Field of Classification Search
CPC ..... B29C 65/06; B29C 65/0618; B29C 65/72; B29C 66/8322
(Continued)

(56) References Cited

U.S. PATENT DOCUMENTS 4,352,711 A    10/1982    Toth
6,814,823 B1 *  11/2004    White .................. B33Y 40/00
                                                 700/123

(Continued)

FOREIGN PATENT DOCUMENTS

EP    2837492 A1    2/2015
EP    3009254 A2    4/2016
(Continued)

OTHER PUBLICATIONS

JP Office Action for JP Application No. 2022-112970 dated Aug. 8, 2023 (8 pages).
(Continued)

*Primary Examiner* — James D Sells
(74) *Attorney, Agent, or Firm* — Reising Ethington P.C.

(57) ABSTRACT

A vibration welding device has a first tool being with a vibration welding head arranged at a first support, wherein the vibration welding head vibrates in use in a first plane, and the first tool receives a first component, a second tool arranged at a second support, wherein the second tool receives a second component or a stack of welded components. The first and the second support are movable with respect to each other at least along a second axis perpendicular to the first plane from an initial position to a vibration welding position. A clamping arrangement having at least two oppositely arranged clamping devices, each having a clamping surface which is moveable along the first axis between a clamping position and open position, wherein in the clamping position, movement of the second component or the stack of welded components at least along the first axis is hindered during vibration welding.

20 Claims, 8 Drawing Sheets

(58) Field of Classification Search
USPC ........................................................ 156/73.5
See application file for complete search history.

(56) References Cited

U.S. PATENT DOCUMENTS

| | | | |
|---|---|---|---|
| 7,520,308 B2* | 4/2009 | Siegler | ................. H02P 25/032 |
| | | | 156/359 |
| 10,220,572 B2 | 3/2019 | Knecht et al. | |
| 10,232,555 B2 | 3/2019 | Fuchs | |
| 2003/0098334 A1 | 5/2003 | Kuechen | |

FOREIGN PATENT DOCUMENTS

| | | |
|---|---|---|
| EP | 3020532 A1 | 5/2016 |
| JP | S57206587 A | 12/1982 |
| JP | H08132528 A | 5/1996 |
| JP | 2016078456 A | 5/2016 |
| WO | WO0174567 A1 | 10/2001 |

OTHER PUBLICATIONS

Machine Translation for JPH08132528 dated May 3, 2022 (24 pages).

* cited by examiner

VIBRATION WELDING DEVICE AND VIBRATION WELDING METHOD

CROSS REFERENCE TO RELATED APPLICATIONS

This application claims the priority of EP patent application No. EP21195906.9, filed on Sep. 10, 2021, and the content of this priority application is incorporated herein by reference in its entirety.

TECHNICAL FIELD

The present disclosure is related to a vibration welding device for welding a first component to a second component or to a stack of welded components, a vibration welding method using the vibration welding device, a retrofitting kit for a vibration welding device as well as a respective retrofitting method.

BACKGROUND

Vibration welding devices for welding two components, normally plastic components, to each other are generally known. Usually, these devices comprise a frame or a housing with a lower tool arranged therein as well as an upper tool arranged therein. The lower tool is fastened to a lifting table, whereas the upper tool is rigidly mounted to an upper tool plate. By means of the lifting table, the lower tool can be moved in the direction of the upper tool to weld a first plastic component in the lower tool to a second plastic component in the upper tool by means of friction or vibration welding.

Such vibration welding devices are used for example in the automotive industry or in the medical technology. In the automotive industry, the vibration welding devices are used for producing lights but may be used also in the production of other components or component groups which consist of plastic or contain plastic. In a similar way, the vibration welding device may be used in the production of devices and/or component groups in the medical technology or in the production of consumer goods.

The basic operation of the vibration welding device is as follows. At first a user places a first plastic component on the lower tool. Subsequently, he positions a second plastic component on the first component in the lower tool. Then, the lifting table with the lower tool and the components arranged thereon moves along the vertical axis from an initial position in the direction of the upper tool until the second component is received in the upper tool.

Now, a welding of the first component to the second component by means of friction or vibration welding takes place. After finishing the welding, the lifting table moves with the lower tool and the compound of first and second component arranged thereon along the vertical axis from the welding position back into the initial position. As soon as the lifting table has reached the initial position, the user removes the compound of first and second component.

Respective vibration welding device, also including a preheating arrangement, are for example known from EP 3 020 532 A1, EP 2 837 492 A1 and EP 3 009 254 A2.

A disadvantage of the above-described plastic welding device becomes apparent if one plastic component shall be welded to a stack of already welded plastic components, i.e. in case the plastic component arranged in the lower tool consists of a plurality of already welded plastic components or layers. In this case, the vibrations transferred from the vibration welding head of the upper tool to the one plastic component arranged therein is also transferred to the stack of already welded plastic components. Depending on the height of the stack of welded plastic components, the end of the stack of welded components being in abutment with the first plastic component moves with the one component in the upper tool to such an extent that the resulting weld seam is of reduced quality or no weld connection at all can be established.

It is therefore an object of at least some implementations of the present disclosure to provide a welding device by means of which the above disadvantages can be overcome so that a further component can be welded to a stack of welded components in a reliable manner. Additionally, it is also an object of at least some implementations of the present disclosure to provide a respective vibration welding method.

SUMMARY

A vibration welding device, a vibration welding method, a retrofitting kit as well as a retrofitting method are disclosed. Further embodiments and developments result from the following description, the drawings as well as the appending claims.

A vibration welding device for welding a first component to a second component or to a stack of welded components, comprises a first tool being an upper tool with a vibration welding head which may be arranged at a first support, wherein the vibration welding head may vibrate in use in a first plane, which may be only along a first axis, and the first tool serves for receiving the first component, a second tool being a lower tool which may be arranged at a second support, wherein the second tool serves for receiving the second component or the stack of welded components, wherein the first and the second support are movable with respect to each other at least along a second axis being perpendicular to the first plane from an initial position to a vibration welding position, and a clamping arrangement comprising at least two oppositely arranged clamping devices, each having a clamping surface which is moveable along the first axis between a clamping position and an open position, wherein in the clamping position a movement of the second component or the stack of welded components at least along the first axis is hindered during vibration welding.

In the following, the vibration welding device will be explained based on its use. As starting point, it is assumed that the first component, which may be a plastic component, is already arranged in the first tool, i.e. in the upper tool. For example, it can be held there by means of an underpressure. In the second tool, i.e. the lower tool, the second component or the stack of welded components is arranged. The second component or the stack of welded components may be made of a plastic material. For the exemplary operation, the first support of the vibration welding device is an upper mounting plate and the second support is a lifting table, which may be a lifting table driven by an electric motor or by hydraulics. Further, it is assumed that the vibration welding head oscillates only along the first axis in the first plane.

In use, the second support with the lower tool is moved relative to the first support. For example, the second support is moved in the direction of the fixedly arranged first support. This movement is performed until the first component abuts at the second component or at the stack of welded components. This position is also referred to as vibration welding position.

In difference to the prior art, the welding device comprises additionally a clamping arrangement. This clamping arrangement has at least two oppositely arranged clamping devices, each having a clamping surface which is moveable along the first axis between a clamping position and an open position. In the vibration welding position, i.e. when the first component in the upper tool and the second component or the stack of welded components in the lower tool abut each other, the clamping surfaces of the clamping devices are moved relative to each other along the first axis such that approach the clamping position. In this clamping position, a movement of the second component or the stack of welded components is hindered or prevented during vibration welding. The movement of the second component or the stack of welded components with the first component is at least reduced to such an extent, if not eliminated, that a weld seam results, which may be a weld seam of the desired quality. The clamping surfaces of the clamping devices may be locked in the clamping position so that they are fixedly arranged in the clamping position during vibration welding.

The clamping position is, according to one alternative, a fixed position. In another alternative, the two oppositely arranged clamping devices work with trigger force to find the position of the stack of welded components and approach the desired clamping position.

Moreover, the clamping position is in one alternative a position in which the clamping surfaces of the clamping devices are in direct abutment with the second component or the stack of welded components. According to another alternative, the clamping position is a position in which the clamping surfaces of the clamping devices are offset from the second component or the stack of welded components by a short distance, for example, 0.2 mm. The reason for the latter course of procedure is that no additional stress is introduced into the stack of welded components during vibration welding. Further, the stack of welded components is also not moved by the clamping arrangement, in particular by the clamping surfaces of the clamping devices. Finally, it has to be noted that the clamping surfaces of the clamping devices may be used for each layer of the stack of welded components or, mainly in the area or portion in which the self-resonance frequency may occur. This will be explained later with respect to the certain embodiments.

Further, the clamping surface of one clamping device may be arranged by means of for example a servo motor in a defined position with respect to the second component or stack of welded components. The defined position may be a position in which a short distance, for example the above-mentioned 0.2 mm, is present between the clamping surface and the second component or the stack of welded components. On the opposite side of the second component or stack of welded components, the clamping surface of the other clamping device applies a defined force. Also, for example instead of the servo motor, a pneumatic cylinder may be used for moving the clamping surface of the respective clamping device.

After the vibration welding has ended, the clamping arrangement is released from the clamping engagement and the second support with the second tool, i.e. the lower tool, having the compound of first and second component or the increased stack of welded components is moved to the initial position.

From this stage, in particular in case only a compound or stack of only two components is present, the above steps are repeated by arranging another first component in the first tool, i.e. the upper tool. After the steps have been repeated for the desired number of times so that the desired stack is present, the user can remove the resulting stack of components from the vibration welding device.

In this regard it must be considered, in particular when repeating the above steps, that the stack of welded components is increased in each cycle by a further component or layer. Thus, the movement of the first and the second support relative to each other must be controlled very precisely as the welding position, i.e. the distance between the first and second support, is adjusted for each new cycle. For example, the vibration welding position which is approached by the second support, i.e. the lifting table, at the beginning is such that the first and the second component abut each other. After the vibration welding, the stack of two components is present in the lower tool, i.e. the increased stack of welded components. Now, another first component shall be welded to the increased stack of welded components, which forms now the second component or the stack of welded components. Accordingly, the vibration welding position from the beginning cannot be used as the distance between the first and the second support would be too small. Thus, the vibration welding position must be adjusted in each cycle by the thickness of the added component. In particular, the distance between the first and the second support along the second axis may be increased accordingly. For this reason, a lifting table may be used which may be driven by an electric motor or by hydraulics as second support because the resulting movement can be controlled very exactly.

One advantage of the vibration welding device is that the stress to the weld seams being already present in the stack of welded components is reduced during vibration welding. A further advantage is that the oscillation of the vibration welding head and, thus, the first component, can be kept constant and out of the self-resonance frequency. Finally, it is advantageous that the vibration cycle time can be kept constant so that the processing time is not increased.

As it was assumed initially that the vibration welding head oscillates only along the first axis in the first plane, we discuss in the following the vibration welding device having a vibration welding head oscillating in the first plane, i.e. having an orbital welding head. In this case, for example two, further clamping devices having each also a clamping surface may be provided. These further clamping devices are oriented such that their clamping surfaces hinder or prevent in the clamping position a movement of the second component or the stack of welded components for example along the axis in the first plane which is perpendicular to the first axis. The respective axis is also called the third axis. In other words, the clamping arrangement comprises four clamping devices, wherein an angle of 90° is enclosed between two adjacent clamping devices.

According to a further embodiment, the clamping arrangement of the vibration welding device is fixed to the second support or to a frame of the vibration welding device. The advantage of a fastening of the clamping arrangement at the second support is that the clamping arrangement is moved along the second axis together with the second support, in particular the lifting table. This increases the flexibility of the vibration welding device. In case the clamping arrangement is fixed to the frame, it maintains its position independent of the movement of the second support which reduces the controlling effort.

Further, and according to another embodiment, the clamping surface of one or both of the at least two clamping devices may be movable along the second axis. By means of this movability, the position of the clamping surfaces along the second axis can be adjusted depending on the thickness of the first component and/or the position of the second component or the stack of welded components. Thus, it can be reliably ensured that the clamping surfaces only clamp the second component or the stack of welded components without hindering an oscillation or vibrating of the first component. This movability may allow in at least some implementations a moving of the clamping surfaces along the Z-axis during and/or after vibration welding. Due to this, the stack of welded components is stabilized during the phase after the movement of the vibration welding head has stopped and in which a force is applied onto the components for creating a reliable welding connection.

Moreover, it is advantageous that the vibration welding device comprises a plurality of clamping devices, as discussed above with respect to the orbital welding head, wherein each clamping device provides a respective clamping surface. Further, the clamping surface of at least one, two, or each, clamping device may be movable along the second axis. By means of this embodiment, the above discussed advantages can be achieved also in case a plurality of clamping devices is used in the clamping arrangement.

Finally, the vibration welding device may comprise a preheating arrangement. By means of such a preheating arrangement, the sides of the first component and of the second component or of the stack of welded components facing each other can be preheated so that the characteristics of the resulting weld seam are further improved. In particular, the occurrence of loose particles during the beginning of the later vibration welding may be reduced by means of preheating the respective welding structures.

Concerning the respective course of procedure in case of a preheating, after the first component has been arranged in the first tool, i.e. the upper tool, the lifting table moves along the second axis back into an intermediate position in which the preheating arrangement can be moved from a parking position into an preheating position between the components. After the preheating arrangement has been arranged between the two components, the two components are preheated at the places to be welded. Subsequently to the preheating, the preheating arrangement is moved from the preheating position back to the parking position. Thereafter, the lifting table is moved along the second axis into the vibration welding position, as described above.

A vibration welding method using the vibration welding device comprises the steps of arranging the first component in the first tool, moving the second support with the second component or the stack of welded components relative to the first support along the second axis to the vibration welding position, moving the clamping surfaces of at least two oppositely arranged clamping devices along the first axis into a clamping position so that a movement of the second component or the stack of welded components at least along the first axis is hindered, then vibration welding the first component to the second component or to the stack of welded components so that an increased stack of welded components results, thereafter moving the clamping surfaces along the first axis into an open position and subsequently moving the second support back to the initial position. By mean of the vibration welding method using the vibration welding device, a stack of components can be produced in a process-reliable manner having weld seams of the desired quality, even in case of a stack of components having a certain height or number of layers. As the vibration welding method uses the vibration welding device, it is referred to the above explanations with respect to the technical effects and advantages.

In a further embodiment of the vibration welding method, the step of arranging the first component in the first tool comprises the steps of arranging the first component in the second tool, which may be on the second component or on the stack of welded components, and moving the second support with the first component relative to the first support along the second axis from the initial position to a transfer position. By means of these method steps, the user places the first component on the second tool, which is then moved for transferring the first component to the first tool. This eliminates the manual step of arranging the first component in the first tool.

Moreover, the step of moving the clamping surfaces to the clamping position may comprise the steps of moving the first clamping surface in a first direction along the first axis and moving the oppositely arranged second clamping surface in a second direction opposite to the first direction along the first axis, and that the step of moving the clamping surfaces to the open position comprises the steps of moving the first clamping surface in the second direction along the first axis and moving the oppositely arranged second clamping surface in the first direction opposite to the second direction along the first axis.

In this regard, and as explained above, it has to be noted that the two oppositely arranged clamping devices can also work with trigger force to find the position of the stack of welded components. Moreover, the clamping position may be either a position in which the clamping surfaces of the clamping devices are in direct abutment with the second component or the stack of welded components or in which the clamping surfaces of the clamping devices are offset from the second component or the stack of welded components by a short distance, for example, 0.2 mm. In each case, the clamping surfaces in this position may be locked. The reason for a clamping position in which the clamping surfaces are offset by a short distance is that no additional stress is introduced specifically into the stack of welded components during vibration welding. Further, the stack of welded components is also not moved by the clamping arrangement, in particular by the clamping surfaces of the clamping devices.

Also, it is advantageous for the vibration welding method, in case the clamping surface of at least one, or each, clamping device may be movable along the second axis, that the vibration welding method comprises the further step of moving the clamping surface of one, two or each clamping device along the second axis such that an end of the respective clamping surface adjacent to the first tool may be arranged in the clamping position at or adjacent to an end of the second component or of the stack of welded components abutting the first component. Due to this, it is possible that the clamping devices can be used for each layer of the stack of welded components or, mainly in the area or portion in which the self-resonance frequency may occur.

Furthermore, when the vibration welding device comprises a preheating arrangement, the vibration welding method may comprise, after the step of arranging the first component in the first tool and before the step of moving the second support to the vibration welding position, the further steps of moving the second support relative to the first support into a preheating position, moving the preheating arrangement from a parking position into a preheating position between the first and the second tool, preheating the first component and the second component or the stack of welded components, and moving the preheating arrangement from the preheating position into the parking position. By means of this, an effective preheating can be achieved, which has been described above in combination with a further embodiment of the vibration welding device.

A retrofitting kit for a vibration welding device having a vibration welding head which may vibrate during use in a first plane, which may be only along a first axis, comprises a clamping arrangement having at least two clamping devices, each having a clamping surface which is moveable along the first axis between a clamping position and an open position so that in the clamping position a movement of the second component or the stack of welded components at least along the first axis can be hindered during vibration welding. By means of the retrofitting kit, a common vibration welding device can be equipped with the clamping arrangement so that, after adapting the control method, the vibration welding device realizes the technical effects and advantages of the above-described vibration welding device. Thus, and for avoiding unnecessary repetitions, it is referred to the above explanation.

In a further embodiment of the retrofitting kit, at least one clamping surface may be movable along a second axis being perpendicular to the first plane. By means of this combination, the flexibility of the resulting vibration welding device is further increased, as also discussed above.

A retrofitting method for a vibration welding device comprises the steps of providing a retrofitting kit, fastening the clamping devices at a lifting table or a frame of the vibration welding device such that the at least two clamping surfaces are arranged opposite to each other and implementing the clamping device in the control method of the vibration welding device. Consequently, by means of the retrofitting method a common vibration welding device can be improved so that it realizes the technical effects and advantages of the above-described vibration welding device.

BRIEF DESCRIPTION OF THE DRAWINGS

In the following, the present disclosure will be described in detail based on the drawings. In the drawings, the same reference signs denote the same elements and/or components. It shows.

DETAILED DESCRIPTION

Figure 1:
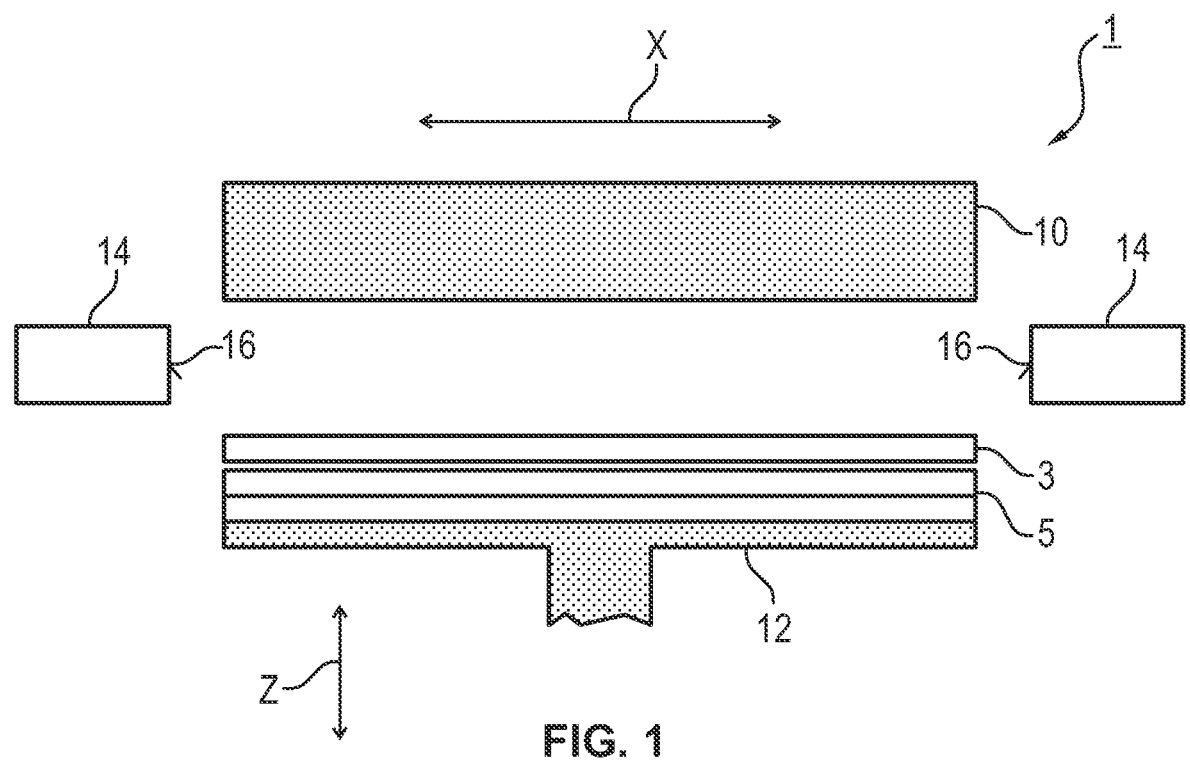
FIG. 1 a schematic front side view of an embodiment of the vibration welding device in an initial position, FIG. 2 a schematic front side view of the embodiment of FIG. 1 in a transfer position, FIG. 3 a schematic front side view of the embodiment of FIG. 1 in a preheating position, FIG. 4 a schematic front side view of the embodiment of FIG. 1 in a vibration welding position and before vibration welding, FIG. 5 a schematic front side view of the embodiment of FIG. 1 in a vibration welding position and after vibration welding, FIG. 6 a schematic front side view of the embodiment of FIG. 1 in the initial position after vibration welding, FIG. 7 a schematic front side view of a further embodiment of the vibration welding device in a vibration welding position before vibration welding, FIG. 8 a further schematic front side view of the further embodiment of FIG. 7 in a vibration welding position before vibration welding, FIG. 9 an enlarged view of the left side of FIG. 8, FIG. 10 a schematic course of procedure of an embodiment of the vibration welding method, and FIG. 11 a schematic course of procedure of an embodiment of the retrofitting method.
Figure 2:
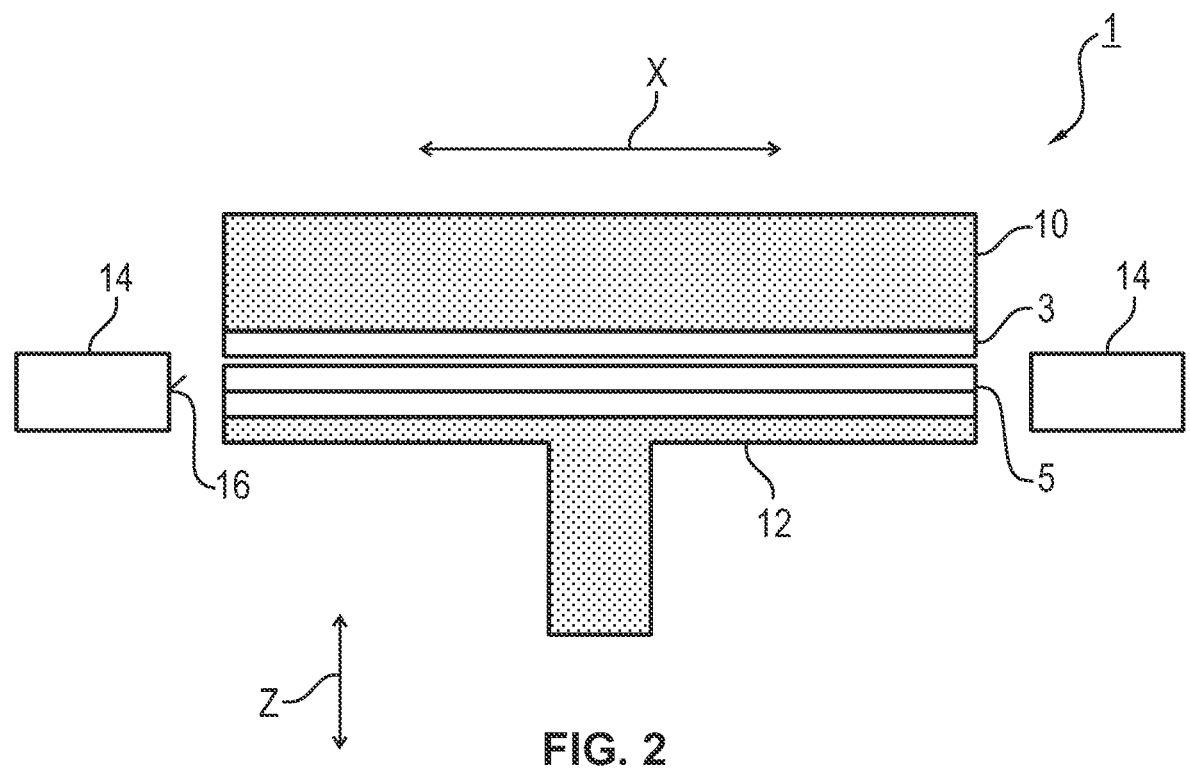

Embodiments of the vibration welding device 1; 100 are described in the following specifically with respect to the functioning thereof. In general, the vibration welding device may be used in the automotive industry, energy industry or in the medical technology. In particular, it may be used in any application in which a component, which may be a plastic component, shall be welded by means of vibration welding to a stack of already welded components, which may be a stack of already welded plastic components, in a reliable manner.

Now referring to FIGS. 1 to 6, a first embodiment of the vibration welding device 1 as well as its functioning are described. The vibration welding device 1 comprises a first tool being an upper tool 10 with a vibration welding head which is arranged at a first support. The vibration welding head of the upper tool 10 defines a vibration welding or first plane and oscillates or vibrates at least along a first axis X in use. Instead of an upper tool 10 having a vibration welding head which vibrates in the first plane only along one axis, i.e. the first axis X, it is also possible to use an upper tool having an orbital vibration welding head. In this case, the vibration welding head would perform a circular movement in the first plane, which can be described by means of the first axis X and the further axis Y, being perpendicular to the first axis X.

Now referring back to FIG. 1, the vibration welding device 1 comprises also a second tool being a lower tool 12 which is arranged at a second support. The first and the second support and, thus, the upper 10 and the lower tool 12 are movable with respect to each other at least along a second axis Z. The second axis Z is perpendicular to the first plane.

With respect to this embodiment, the first support of the vibration welding device 1 is an upper mounting plate and the second support is a lifting table, which may be a lifting table driven by an electric motor or by hydraulics. In particular due to the electric motor or the hydraulics, a precise control can be realized which facilitates the vibration welding method.

Furthermore, the vibration welding device 1 has a clamping arrangement comprising at least two oppositely arranged clamping devices 14. Each clamping device 14 provides a clamping surface 16. In the embodiment shown, the clamping arrangement is fastened to a frame (not shown). Thus, it does not automatically move with the first or second support. For an easier understanding, the so constructed vibration welding device 1 will be explained during use.

First of all, and as can be seen from FIG. 1, the upper 10 and the lower tool 12 and, thus, the first and the second support are in an initial position in which they are sufficiently spaced from each other such that a user may place a first component 3 on a second component or a stack of welded components 5. As shown, a stack of two welded components 5 is present in the lower tool 12. The first component 3 has been placed on the stack of welded components 5 in the lower tool. Further, the clamping surfaces 16 of the clamping devices 14 of the clamping arrangement are in an open position.

In a next step, the second support and, thus, the lower tool 12, is moved along the second axis Z in the direction of the upper tool 10 until a transfer position is reached. In this transfer position, the first component 3 is received by the upper tool 10. For example, the first component 3 is held in the upper tool 10 by an underpressure or the like. Thus, the upper tool 10 serves for receiving the first component 3 and the lower tool 12 serves for receiving the second component or the stack of welded components 5. The clamping surfaces 16 are still in the open position. This state can be seen in FIG. 2.

Thereafter, the lower tool 12 as well as the second support are moved away from the upper tool 10 along the second axis Z into an intermediate position. In case the first component 3 is directly arranged in the upper tool 10, for example manually or by means of a further device, a movement of the lower tool 12 to the intermediate position is not required.

Figure 3:
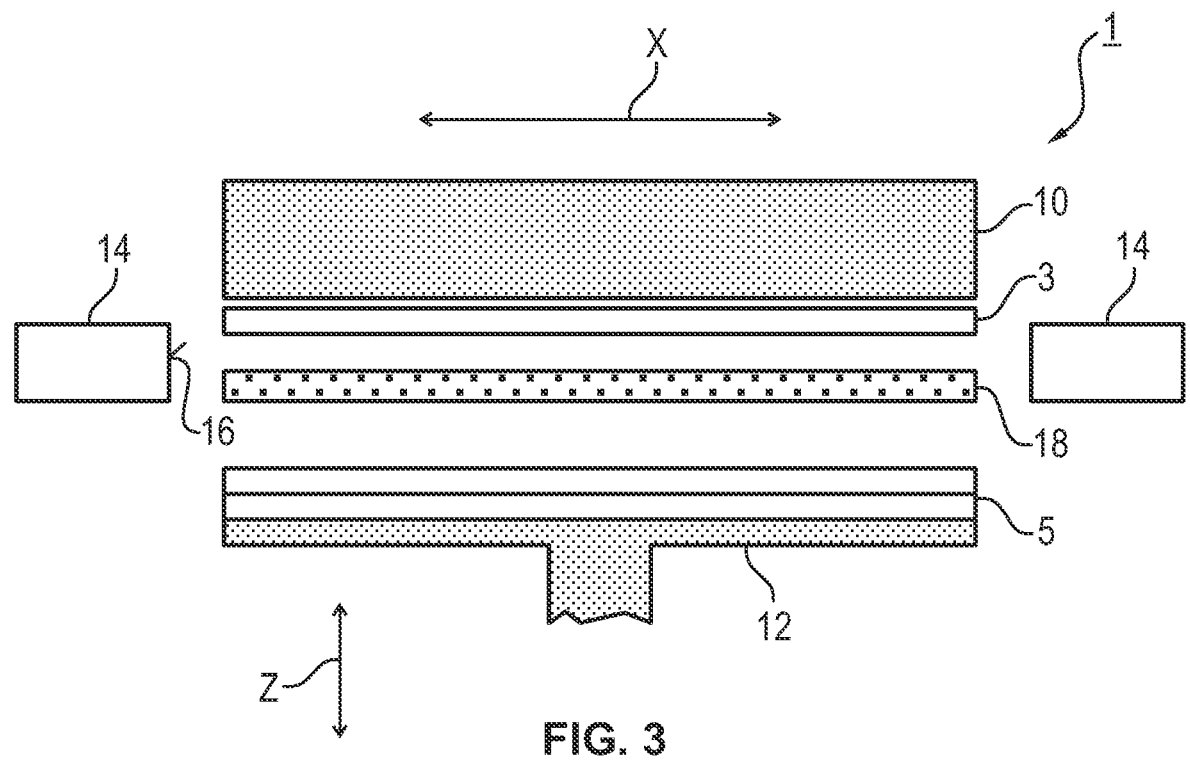

As the vibration welding device 1 comprises also a generally optional preheating arrangement 18, the lower tool 12 and, thus, the second support, is nonetheless moved into the intermediate position. Thereafter, the preheating arrangement 18 is moved from a parking position into a preheating position between the upper 10 and the lower tool 12, which are in the intermediate position. FIG. 3 illustrates this stage of the process. As can be seen, the position of the clamping surfaces 16 is unchanged so that they are in the open position.

After the preheating of the first component 3 and the stack of welded components 5 took place, the preheating arrangement 18 is moved from the preheating position back into the parking position. As respective preheating arrangements, for example with IR radiators, as well as their construction are generally known, they are not described in detail herein.

As soon as the preheating arrangement 18 has reached its parking position, the lower tool 12 can be moved relative to the upper tool 10 into a vibration welding position. In this position, the first component 3 and the stack of welded components 5 abut each other, as can be seen in FIG. 4.

Figure 4:
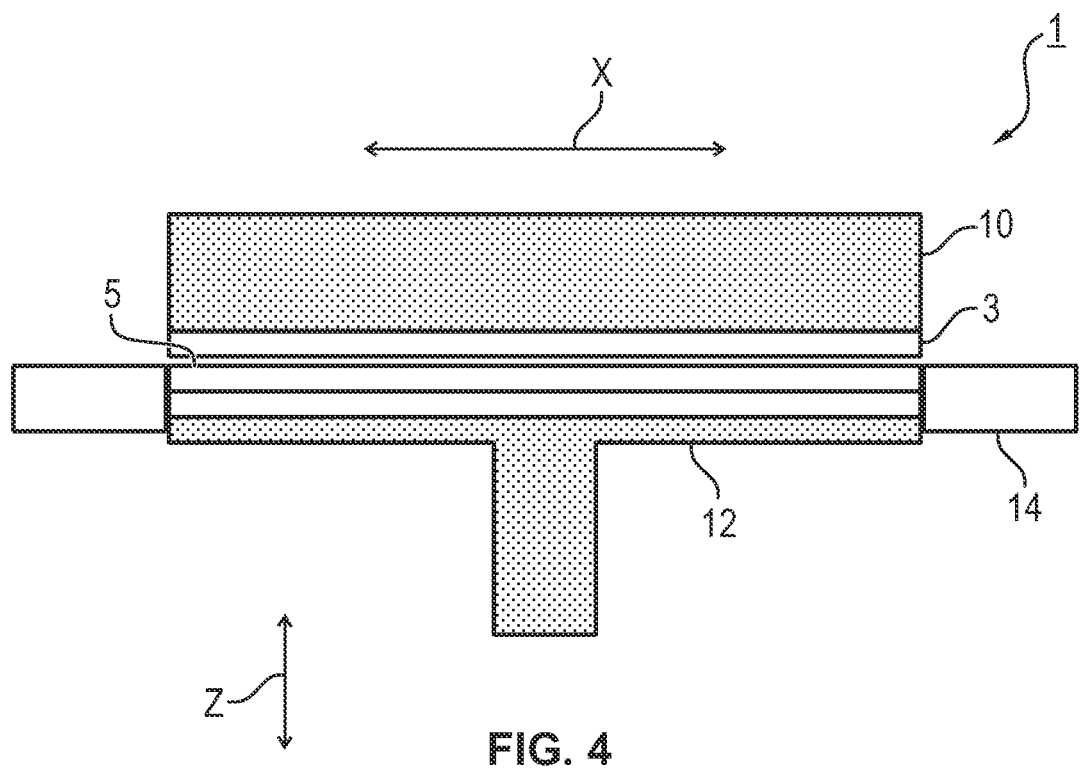
Figure 5:
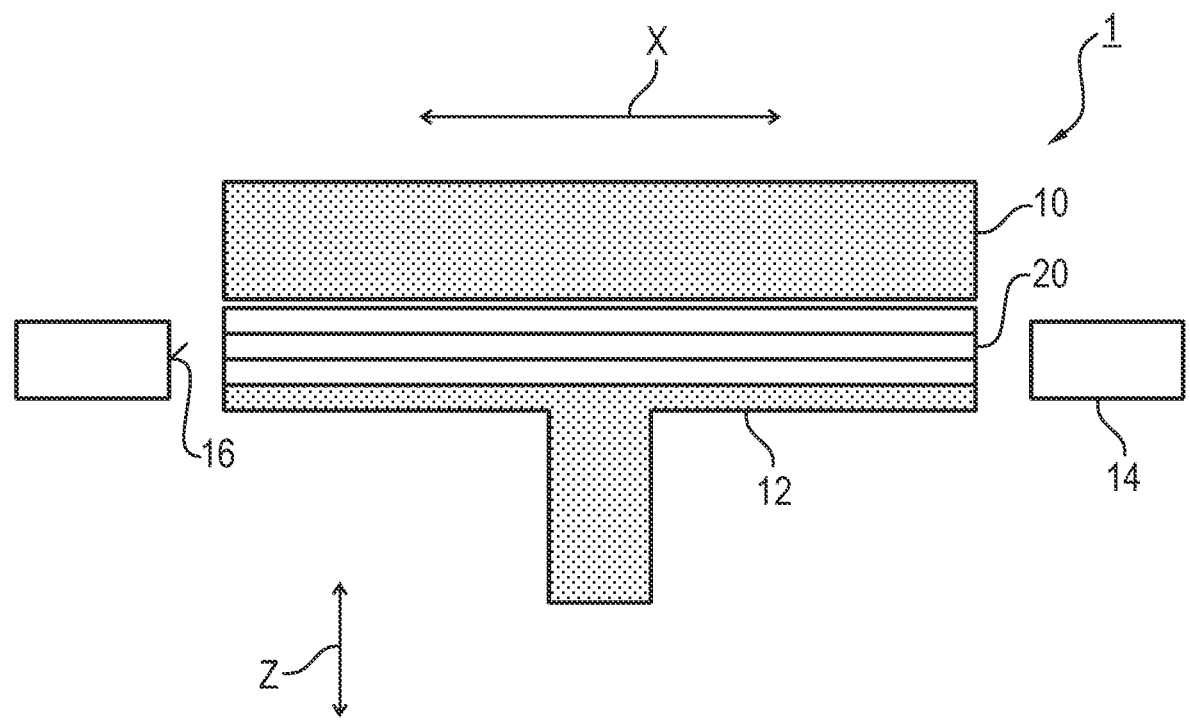
Figure 6:
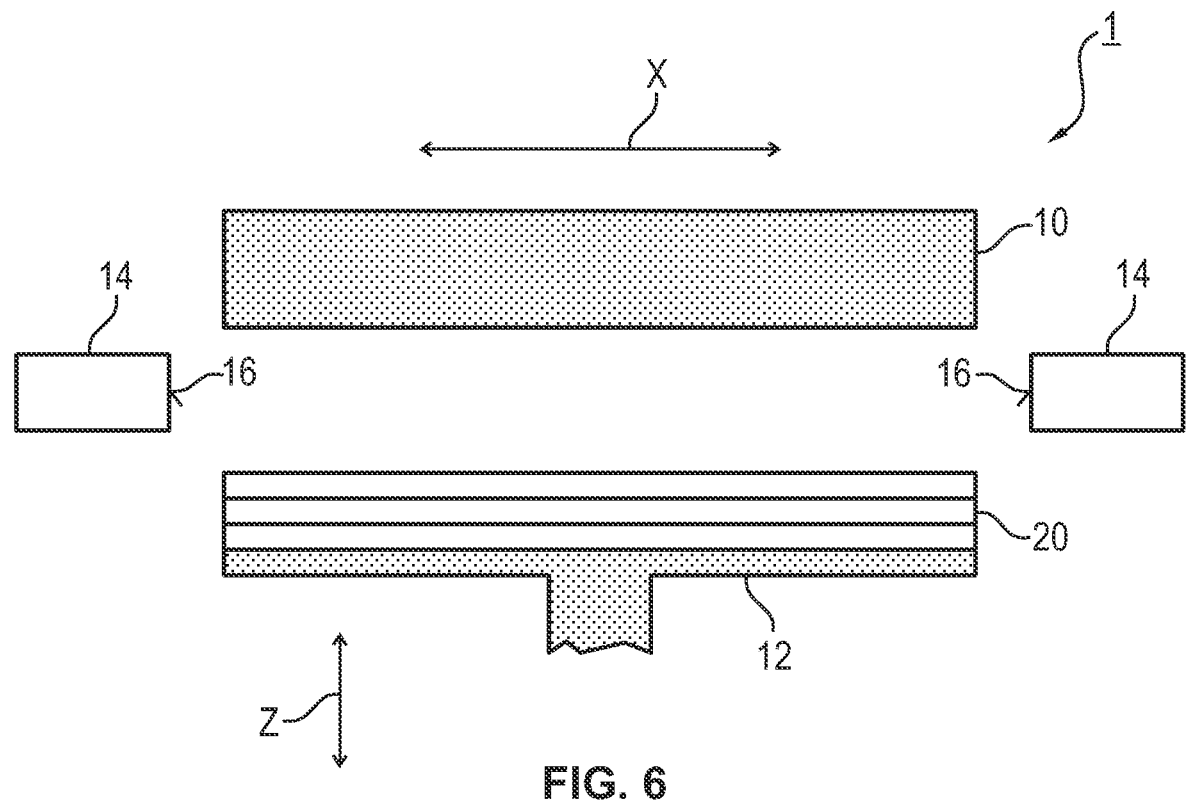

Furthermore, and with respect to FIG. 4, the two oppositely arranged clamping surfaces 16 have been moved relative to each other along the first axis X such that they directly abut and clamp the stack of welded components 5 arranged in the lower tool 12. Thus, the clamping arrangement has been moved from the open position into a clamping position in which a movement of the stack of welded components 5 is hindered or prevented during vibration welding at least along the first axis X. In particular, the movement of the stack of welded components 5 with the first component 3 is at least reduced to such an extent, if not eliminated, that a weld seam of the desired quality results.

In this regard it has to be noted first of all that, as discussed above, the clamping arrangement of the vibration welding device is fixed to the frame of the vibration welding device. Thus, the position of the clamping surfaces of the clamping arrangement along the second axis Z is predetermined and adapted to a specific first component 3. By means of this, the controlling effort is reduced.

As an alternative, the clamping device 14 may be fixed to the second support. In this case, the clamping device and, thus, the clamping arrangement, is moved together with the second support. When using this alternative, it must be ensured that the clamping surfaces 16 abut only at the second component or the stack of welded components 5 in use. Otherwise, a movement of the first component 3 would also be hindered, which would prevent a vibration welding. For avoiding this, the clamping arrangement may be adapted such that it is only used in case the stack of welded components 5 has already a specific height. Alternatively, a movability of the clamping surfaces 16 along the second axis Z may be provided additionally. Particularly the movability of the clamping surfaces 16, may be of each clamping surface 16, along the second axis Z. The latter will be discussed with respect to the second embodiment of the vibration welding device 100.

The advantage of a fastening of the clamping arrangement at the second support is that the clamping arrangement is moved along the second axis Z together with the second support, in particular the lifting table. This increases the flexibility of the vibration welding device 1.

For the sake of completeness, it is pointed out that also in case the clamping arrangement is fastened at the frame, a movability of the clamping surfaces 16 along the second axis Z may be provided additionally. By means of this, the vibration welding device 1 may be adapted to the processing of other components without requiring a removing and refastening of the clamping arrangement in a new position at the frame.

Further, it has to be noted that the two oppositely arranged clamping devices 14 can work with trigger force to find the position of the stack of welded components 5 instead of approaching the clamping position as fixed position. Moreover, the clamping position may be either a position in which the clamping surfaces 16 are in direct abutment with the second component or the stack of welded components 5 or in which the clamping surfaces 16 are offset from the second component or the stack of welded components 5 by a short distance, for example, 0.2 mm. In each case, the clamping surfaces 16 may be locked.

In case the clamping surfaces 16 are offset by a short distance, no additional stress is introduced specifically into the stack of welded components 5 during vibration welding. Further, the stack of welded components 5 is also not moved by the clamping arrangement, in particular by the clamping surfaces 16 of the clamping devices 14. Finally, it has to be noted that the clamping surfaces 16 of the clamping devices 14 can be used for each layer of the stack of welded components 5 or, mainly in the area or portion in which the self-resonance frequency may occur.

During vibration welding, the upper tool 10 may be moved only along the first axis X. Due to the clamping surfaces 16 of the clamping devices 14, a movement of the stack of welded components 5 along this axis X is hindered or prevented, as described above.

In case the upper tool 10 is an orbital welding tool so that a movement is performed not only along the first axis X but in the vibration welding plane or first plane, two, further clamping devices 14 in the clamping arrangement may be provided, each of which has a respective clamping surface 16. The further clamping devices 14 are arranged opposite to each other and such that they hinder or prevent a movement of the second component or the stack of welded components 5 at least along an axis Y perpendicular to the first axis X but in the first plane. The respective axis Y is also called the third axis Y.

After the vibration welding has ended, the clamping surfaces 16 are moved from the clamping position to the open position, and the second support with the second tool, i.e. the lower tool 12, having the increased stack of welded components 20 is moved to the initial position. This can be seen in FIG. 6.

Now, the above steps are repeated by arranging another first component 3 in the first tool, i.e. the upper tool 10. The increased stack of welded components 20 being present in the lower tool 12 forms, thus, the new stack of welded components 5. After the steps have been repeated for the desired number of times so that the desired stack is present, the user can remove the resulting or final stack of welded components 5 from the vibration welding device 1.

When proceeding in this way, it must be considered, in particular when repeating the above steps, that the stack of welded components 5 may be increased in each cycle by a further component 3 or layer, which may be made of plastic. Thus, the movement of the first and the second support relative to each other must be controlled very precisely as the vibration welding position, i.e. the distance between the first and second support, must be adjusted for each new cycle.

At the beginning, the vibration welding position which is approached by the second support, i.e. the lifting table, is such that the first 3 and the second component 5 abut each other. After vibration welding, the stack of two components is present in the lower tool, i.e. the increased stack of welded components 20. Now, another first component 3 shall be welded to the increased stack of welded components 20, which forms in this new cycle the second component or the stack of welded components 5. Accordingly, the vibration welding position from the beginning cannot be used as the distance between the first and the second support would be too small. Thus, the vibration welding position must be adjusted in each cycle by the thickness of the added component 3. In particular, the distance between the first and the second support along the second axis Z may be increased accordingly. For this reason, a lifting table may be used which may be driven by an electric motor or by hydraulics as second support because the resulting movement can be controlled very exactly.

One advantage of the vibration welding device 1 is that the stress to the weld seams being already present in the stack of welded components 5 is reduced during vibration welding. A further advantage is that the oscillation of the vibration welding head and, thus, the first component 3, can be kept constant and out of the self-resonance frequency. Finally, it is advantageous that the vibration cycle time can be kept constant so that the processing time is not increased.

Figure 7:
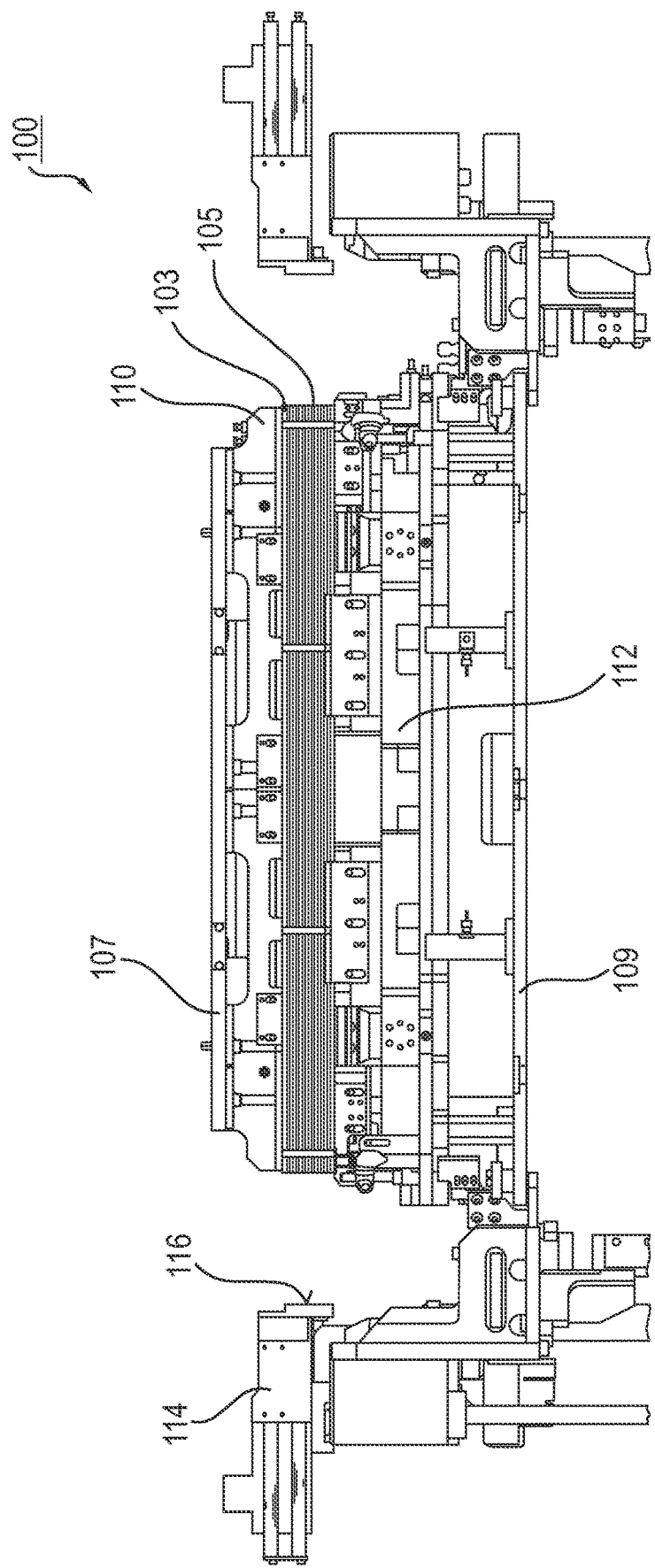
Figure 8:
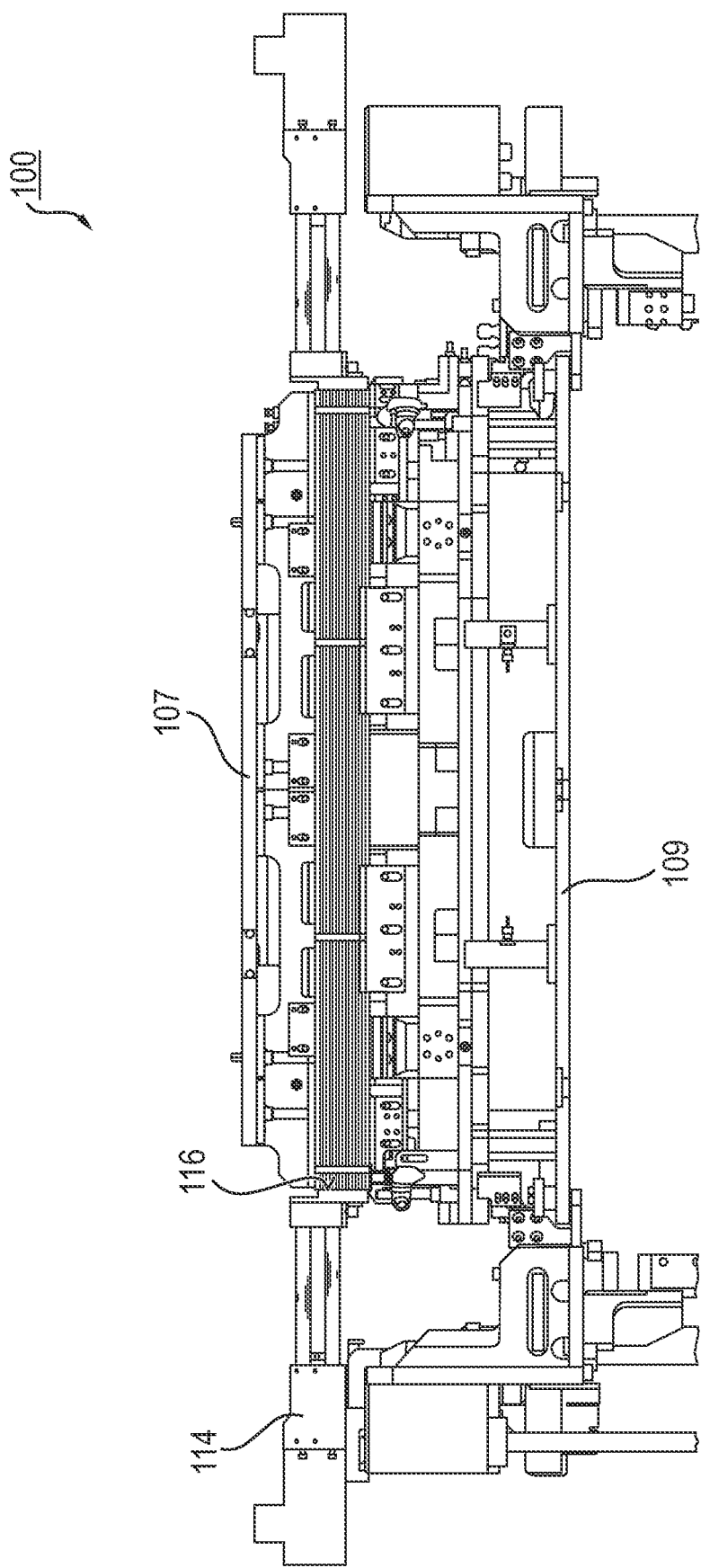
Figure 9:
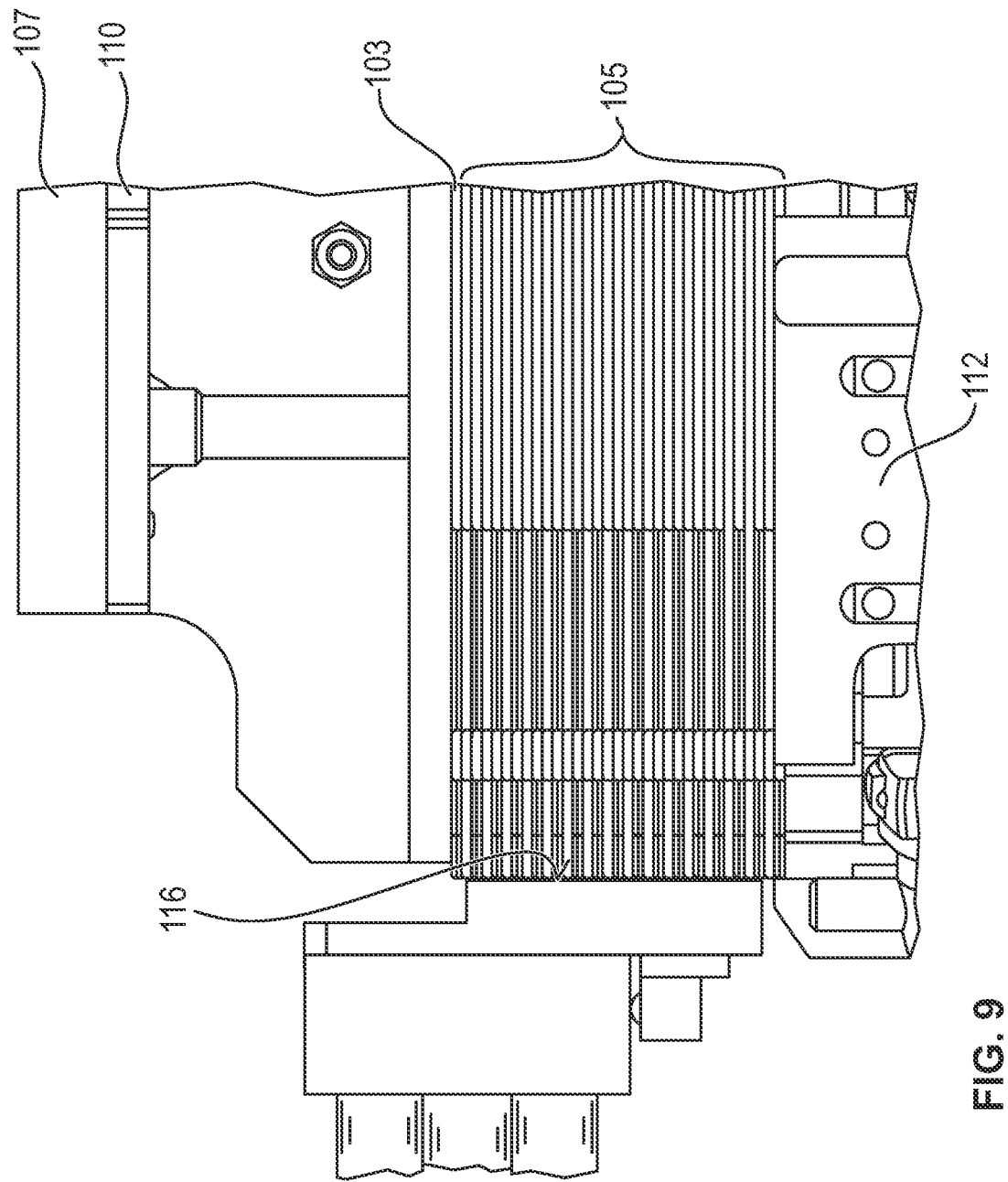

In FIGS. 7 to 9, an alternative embodiment of the vibration welding device 100 is shown. In general, the construction of the vibration welding device 100 is similar to the above-described vibration welding device 1. Nevertheless, and in contrast to the above-described embodiment, the clamping surfaces 116 of the clamping devices 114 here are additionally movable along the second axis Z. This applies regardless of whether the clamping devices 114 are fastened at the frame or at the second support.

By means of this movability, the position of the clamping surfaces 116 along the second axis Z can be adjusted depending on the thickness of the first component 103 and/or the position of the second component or the stack of welded components 105. Thus, it can be reliably ensured that the clamping surfaces 116 only clamp the second component or the stack of welded components 105 without hindering an oscillation or vibrating of the first component 103. Accordingly, this movability may also allow in at least some implementations a moving of the clamping surfaces 116 along the Z-axis during and/or after vibration welding. Due to this, the stack of welded components 105 may be stabilized during the phase after vibration welding in which a force is applied onto the components 103, 105 for creating a reliable welding connection.

Figure 10:
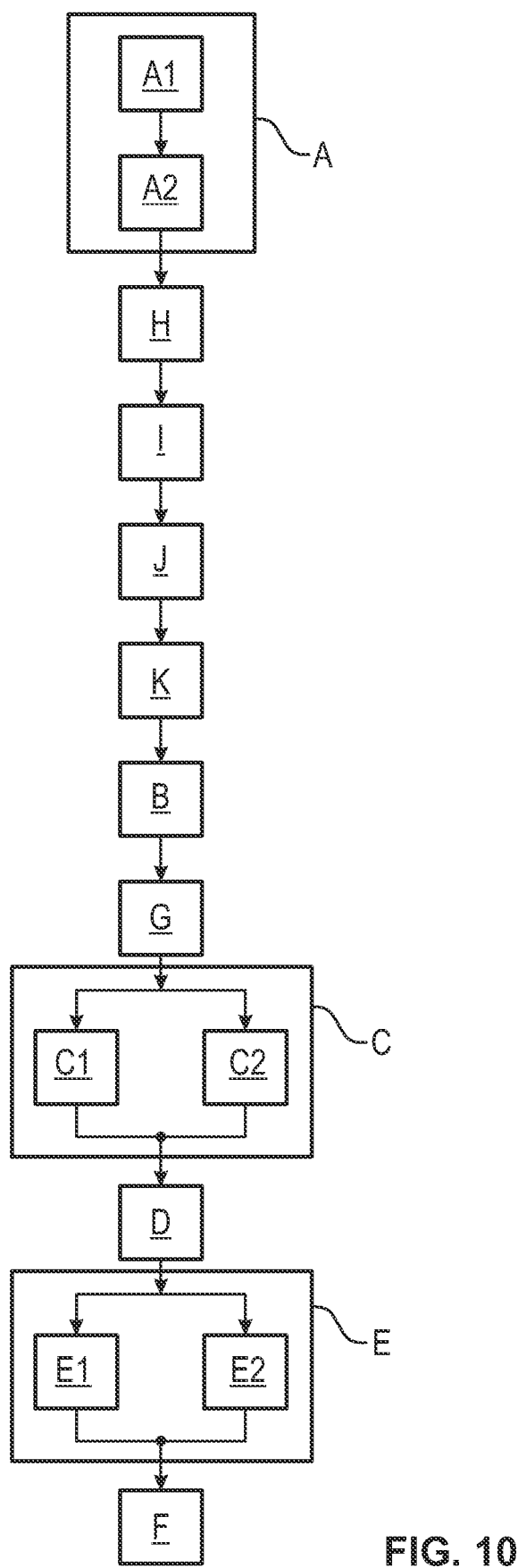

Now referring to FIG. 10, an embodiment of a respective vibration welding method is explained. In a first step A, an arranging of the first component 3; 103 in the first tool takes place. This can be performed directly by the user. As an alternative, this step A of arranging the first component 3; 103 in the first tool comprises the steps A1 and A2. In step A1, the first component 3; 103 is arranged in the second tool, which may be on the second component or on the stack of welded components 5; 105. In the following step A2, the second support 109 with the first component 3; 103 is moved relative to the first support 107 along the second axis Z from the initial position to a transfer position. By means of these method steps, the user places the first component 3; 103 on the second tool, which is then moved for transferring the first component 3; 103 to the first tool. This eliminates the manual step of arranging the first component 3; 103 in the first tool.

Subsequently, and in case the vibration welding device 1; 100 comprises a preheating arrangement 18, the method comprises the further steps H to K. In step H, the second support 109 is moved relative to the first support 107 into an intermediate position. This step may also be performed independently from the presence of a preheating arrangement 18 for checking that the first component 3; 103 is securely retained in the first tool, i.e. the upper tool 10; 110.

Next, the preheating arrangement 18 is moved in step I from a parking position into a preheating position between the first and the second tool. In step J, a preheating of the first component 3; 103 and of the second component or the stack of welded components 5; 105 takes place. After the preheating, the preheating arrangement is moved in step K from the preheating position into the parking position. By means of this course, an effective preheating can be achieved.

After the preheating, the second support 109 with the second component or the stack of welded components 5; 105 is moved in step B relative to the first support 107 along the second axis Z to the vibration welding position.

In the vibration welding position, in which the first component 3; 103 and the second component or the stack of welded components 5; 105 are in abutment, the optional step G may be performed. A requirement for this step is that the clamping surface 16; 116 of at least one, or each, clamping device 14; 114 is movable along the second axis Z. This movement is independent from a fixation of the clamping devices 14; 114 at the frame or the second support 109, i.e. independent from a movement of the clamping arrangement with the second support 109, for example. To the contrary, it provides an additional degree of freedom for the clamping surface 16; 116 provided by the clamping device 14; 114 as the clamping surface 16; 116 is in particular with respect to the clamping device 14; 114 movable along the second axis Z.

Due to this, in step G a moving of the clamping surface 16; 116 of one, two or each clamping device 14; 114 along the second axis Z may be performed such that an end of the respective clamping surface 116 adjacent to the upper tool 10; 110 is arranged in a clamping position at or adjacent to an end of the second component or of the stack of welded components 5; 105 abutting the first component 3; 103. This is shown, for example, in FIGS. 4, 8 and 9.

As a result, the clamping surfaces 16; 116 abut at the stack of welded components 5; 105 directly adjacent to the first component 3; 103. This stabilizes the stack of components 5; 105 in an effective manner without hindering a movement of the first component 3; 103 during vibration welding. Generally, it is possible by means of the movability of the clamping surfaces 16; 116 along the second axis Z that the clamping surfaces 16; 116 can be used for each layer of the stack of welded components 5; 105 or, mainly in the area or portion in which the self-resonance frequency may occur. Furthermore, the position of the clamping surfaces 16; 116 can be adapted in an easy manner to the thickness of the first component 3; 103.

After the position of the clamping surfaces 16; 116 along the second axis Z has been adjusted, a moving of the clamping surfaces 16; 116 of at least two oppositely arranged clamping devices 14; 114 along the first axis X into the clamping position is performed in step C. As a result, a movement of the second component or of the stack of welded components 5; 105 is hindered at least along the first axis X.

The above step C may be comprised of the steps C1 and C2. In step C1, a moving of the first clamping surface 16; 116 in a first direction along the first axis X takes place while before, after or at the same time with step C1 a moving of the oppositely arranged second clamping surface 16; 116 in a second direction opposite to the first direction along the first axis X is performed in step C2. In case for example two further clamping devices are present which are arranged oppositely to each other and the clamping surfaces 16; 116 of which are moveable along the third axis Y, see above, the movement thereof is performed analogously for stabilizing the stack of welded components 5; 105 additionally. This may be in case the vibration welding device comprises an orbital vibration welding head.

In this regard, it has to be noted that the oppositely arranged clamping devices 14; 114 can also work with trigger force to find the position of the stack of welded components 5; 105. Moreover, the clamping position is a position in which the clamping surfaces 16; 116 are in direct abutment with the second component or the stack of welded components 5; 105. Alternatively, the clamping position is a position in which the clamping surfaces 16; 116 are offset from the second component or the stack of welded components 5; 105 by a short distance, for example, 0.2 mm. In each case, the clamping surfaces 16; 116 may be locked in the clamping position.

After the clamping devices 14; 114 have been arranged in the clamping position, a vibration welding of the first component 3; 103 to the second component or to the stack of welded components 5; 105 is performed in step D. After the vibration welding is ended, an increased stack of welded components 20 is, thus, present. After the movement of the vibration welding head has stopped, a force may be applied to the increased stack of welded components 20 so that a reliable welding connection results. In particular, waiting a predetermined holding time under application of the force allows for material recrystallisation of the components 3, 5; 103, 105.

Further, and after the vibration welding is finished, in step E a moving of the clamping surfaces 16; 116 along the first axis X into an open position takes place. Like for step C, step E may also comprise the two steps E1 and E2. In particular, in step E1 a moving of the first clamping surface 16; 116 in the second direction along the first axis X is performed while before, after or at the same time in step E2 a moving of the oppositely arranged second clamping surface 16; 116 in the first direction opposite to the second direction along the first axis X takes place.

Subsequently, the second support 109 is moved back to the initial position in step F. Now, the above-described method steps may be repeated until the resulting stack of components 20 has reached a desired height or number of layers. As explained above, and in particular with respect to the vibration welding position but also concerning the transfer position and the intermediate position, the new height of the stack of welded components 5; 105 may be considered when approaching the respective positions.

An embodiment of a retrofitting kit for a vibration welding device having a vibration welding head which may vibrate during use in a first plane, which may be only along a first axis, comprises a clamping arrangement having at least two clamping devices 14; 114, each having a clamping surface 16; 116 which is moveable along the first axis X between a clamping position and an open position so that in the clamping position a movement of the second component or the stack of welded components 5; 105 at least along the first axis X can be hindered during vibration welding. Further, at least one clamping surface 16; 116 may be movable along the second axis Z being perpendicular to the first plane. By means of the retrofitting kit, a common vibration welding device can be equipped with the clamping arrangement so that, after adapting the control method, the vibration welding device realizes the technical effects and advantages of the above-described vibration welding device 1; 100.

Figure 11:
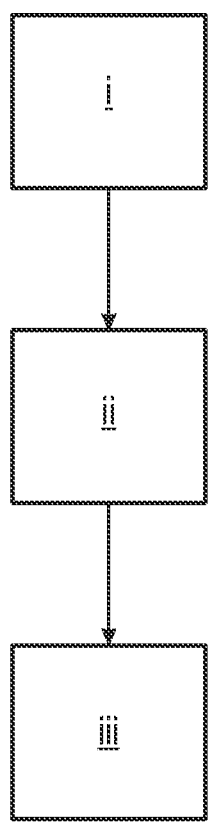

Finally, and with respect to FIG. 11, an embodiment of a retrofitting method for a vibration welding device is discussed. First of all a retrofitting kit is provided in step i. Next, the clamping devices 14; 114 are fastened in step ii at a lifting table or a frame of the vibration welding device such that the clamping surfaces 16; 116 are arranged opposite to each other, Finally, in step iii an implementing of the clamping device 14; 114 in the control method of the vibration welding device is performed. Consequently, by means of the retrofitting method a common vibration welding device can be improved so that it realizes the technical effects and advantages of the above-described vibration welding device 1; 100.

The invention claimed is:

1. A vibration welding device for welding a first component to a second component or to a stack of welded components, comprising
    a. a first tool being an upper tool with a vibration welding head which is arranged at a first support, wherein the vibration welding head vibrates in use in a first plane and the first tool serves for receiving the first component,
    b. a second tool being a lower tool which is arranged at a second support, wherein the second tool serves for receiving the second component or the stack of welded components, wherein
    c. the first and the second support are movable with respect to each other at least along a second axis Z being perpendicular to the first plane from an initial position to a vibration welding position, and
    d. a clamping arrangement comprising at least two oppositely arranged clamping devices, each having a clamping surface which is moveable along the first axis X between a clamping position and an open position, wherein in the clamping position a movement of the second component or the stack of welded components at least along the first axis X is hindered during vibration welding.

2. The vibration welding device according to claim 1, wherein the first support is an upper mounting plate and the second support is a lifting table.

3. The vibration welding device according to claim 1, wherein the clamping arrangement is fixed to the second support or to a frame of the vibration welding device.

4. The vibration welding device according to claim 1, wherein the clamping surface of one or both of the at least two clamping devices is movable along the second axis Z.

5. The vibration welding device according to claim 1, comprising a plurality of clamping devices, each having a clamping surface, and the clamping surface of at least one clamping device is movable along the second axis Z.

6. The vibration welding device according to claim 1, further comprising a preheating arrangement.

7. The vibration welding device according to claim 2, wherein the clamping arrangement is fixed to the second support or to a frame of the vibration welding device.

8. The vibration welding device according to claim 2, wherein the clamping surface of one or both of the at least two clamping devices is movable along the second axis Z.

9. The vibration welding device according to claim 2, comprising a plurality of clamping devices, each having a clamping surface, and the clamping surface of at least one clamping device is movable along the second axis Z.

10. The vibration welding device according to claim 2, further comprising a preheating arrangement.

11. The vibration welding device according to claim 3, wherein the clamping surface of one or both of the at least two clamping devices is movable along the second axis Z.

12. The vibration welding device according to claim 3, comprising a plurality of clamping devices, each having a clamping surface, and the clamping surface of at least one clamping device is movable along the second axis Z.

13. The vibration welding device according to claim 3, further comprising a preheating arrangement.

14. A vibration welding method using the vibration welding device according to claim 1, wherein the method comprises the steps:
   a. arranging the first component in the first tool,
   b. moving the second support with the second component or the stack of welded components relative to the first support along the second axis Z to the vibration welding position,
   c. moving the clamping surfaces of at least two oppositely arranged clamping devices along the first axis into a clamping position so that a movement of the second component or the stack of welded components at least along the first axis X is hindered, then
   d. vibration welding the first component to the second component or to the stack of welded components so that an increased stack of welded components results, thereafter
   e. moving the clamping surfaces along the first axis into an open position and subsequently
   f. moving the second support back to the initial position.

15. The vibration welding method according to claim 14, wherein the step of arranging the first component in the first tool comprises the steps of:
   g. arranging the first component in the second tool, and
   h. moving the second support with the first component relative to the first support along the second axis Z from the initial position to a transfer position.

16. The vibration welding method according to claim 14, wherein the step of moving the clamping surfaces to the clamping position comprises the steps of:
   i. moving the first clamping surface in a first direction along the first axis X and moving the oppositely arranged second clamping surface in a second direction opposite to the first direction along the first axis X, and wherein
   the step of moving the clamping surfaces to the open position comprises the steps of:
   j. moving the first clamping surface in the second direction along the first axis X and moving the oppositely arranged second clamping surface in the first direction opposite to the second direction along the first axis X.

17. The vibration welding method according to claim 14, wherein the clamping surface of at least one clamping device is movable along the second axis Z, and the vibration welding method comprises the further step of
   k. moving the clamping surface of one clamping device along the second axis Z such that an end of the respective clamping surface adjacent to the first tool is arranged in the clamping position at or adjacent to an end of the second component or of the stack of welded components abutting the first component.

18. The vibration welding method according to claim 14, wherein the vibration welding device comprises a preheating arrangement and the method comprises after step A of arranging the first component in the first tool and before step B of moving the second support to the vibration welding position the further steps:
   l. Moving the second support relative to the first support into an intermediate position,
   m. moving the preheating arrangement from a parking position into a preheating position between the first and the second tool,
   n. preheating the first component and the second component or the stack of welded components, and
   o. moving the preheating arrangement from the preheating position into the parking position.

19. The vibration welding method according to claim 15, wherein the step of moving the clamping surfaces to the clamping position comprises the steps of:
   i. moving the first clamping surface in a first direction along the first axis X and moving the oppositely arranged second clamping surface in a second direction opposite to the first direction along the first axis X, and wherein
   the step of moving the clamping surfaces to the open position comprises the steps of:
   j. moving the first clamping surface in the second direction along the first axis X and moving the oppositely arranged second clamping surface in the first direction opposite to the second direction along the first axis X.

20. The vibration welding method according to claim 15, wherein the clamping surface of at least one clamping device is movable along the second axis Z, and the vibration welding method comprises the further step of
   k. moving the clamping surface of one clamping device along the second axis Z such that an end of the respective clamping surface adjacent to the first tool is arranged in the clamping position at or adjacent to an end of the second component or of the stack of welded components abutting the first component.

\* \* \* \* \*

UNITED STATES PATENT AND TRADEMARK OFFICE
CERTIFICATE OF CORRECTION

| | | |
|---|---|---|
| PATENT NO. | : 12,145,325 B2 | Page 1 of 1 |
| APPLICATION NO. | : 17/879040 | |
| DATED | : November 19, 2024 | |
| INVENTOR(S) | : Silvio Fuchs et al. | |

It is certified that error appears in the above-identified patent and that said Letters Patent is hereby corrected as shown below:

On the Title Page

Item (71) Applicant: after Technologies delete "Gmbh" and insert --GmbH--

Item (73) Assignee: delete "Branson" and insert --BRANSON--

Item (73) Assignee: after Technologies delete "Gmbh" and insert --GmbH--

Signed and Sealed this
Thirty-first Day of December, 2024

Derrick Brent
*Acting Director of the United States Patent and Trademark Office*